Figure 16:
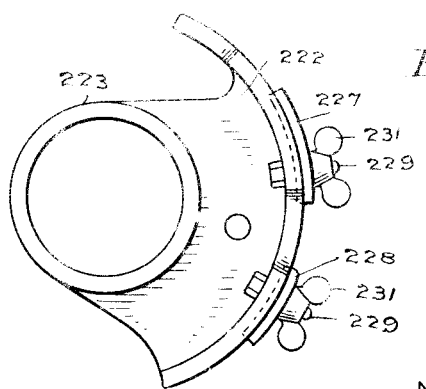

J. F. DORAN.
HAT CROWN POUNCING MACHINE.
APPLICATION FILED MAR. 18, 1911.
1,110,191.
Patented Sept. 8, 1914.
9 SHEETS—SHEET 1.
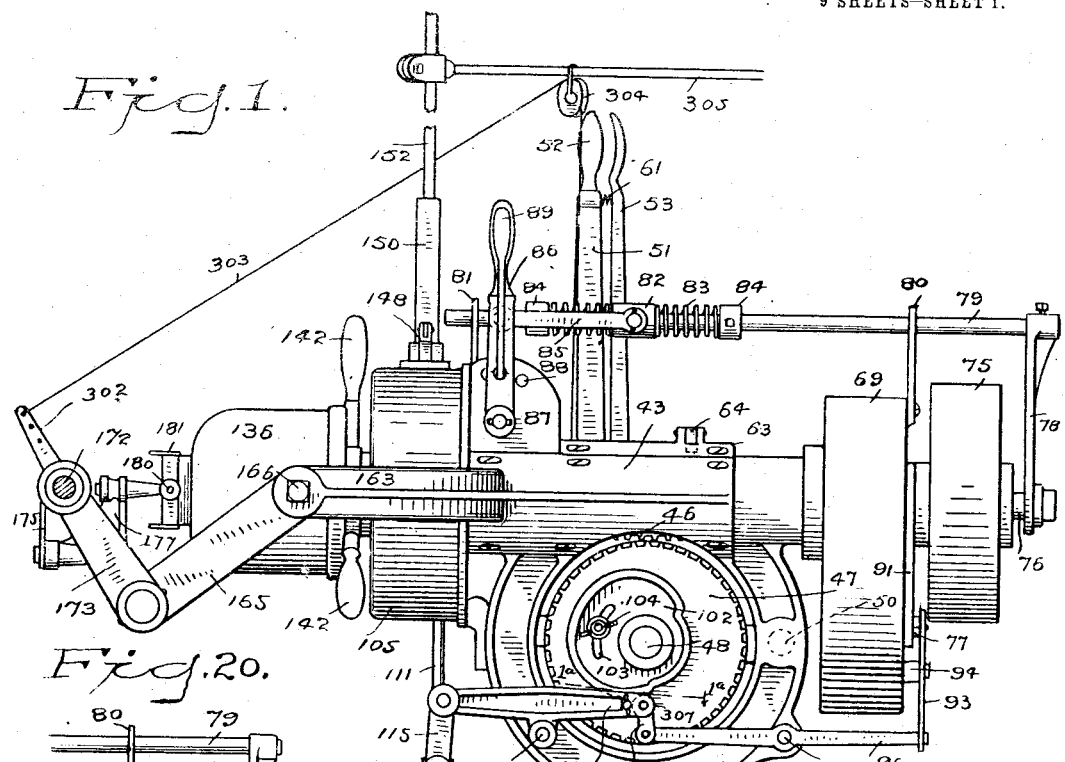
Fig. 1.
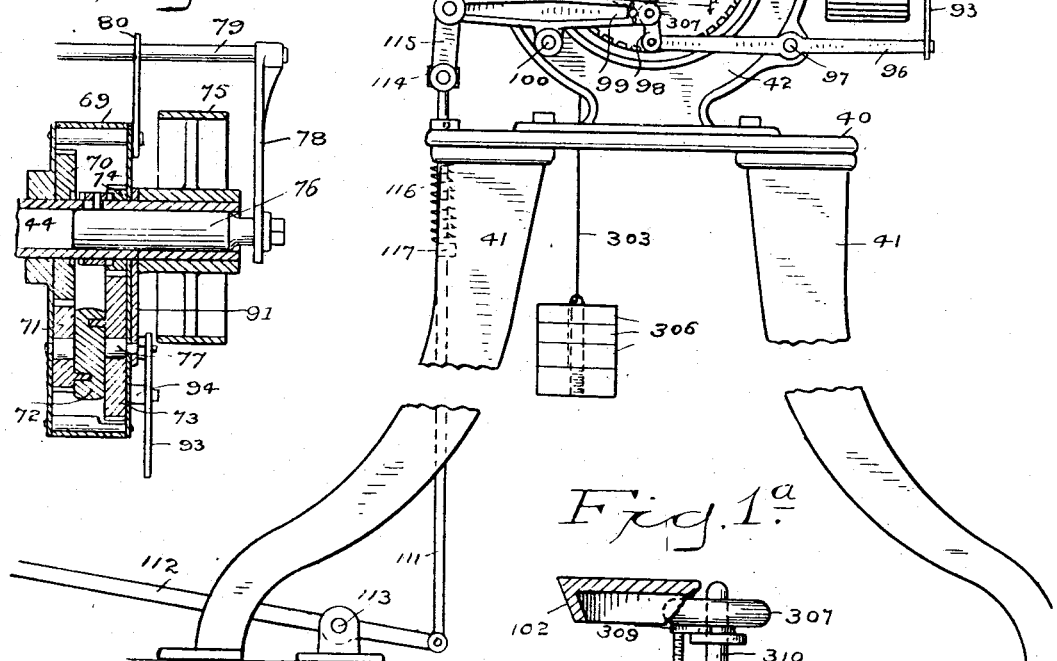
Fig. 20.
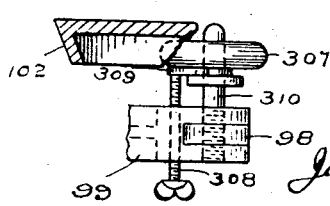
Fig. 1ª.
WITNESSES:
H. H. Lamb.
M. J. Lougden
INVENTOR
Jas. F. Doran
BY
ATTORNEY

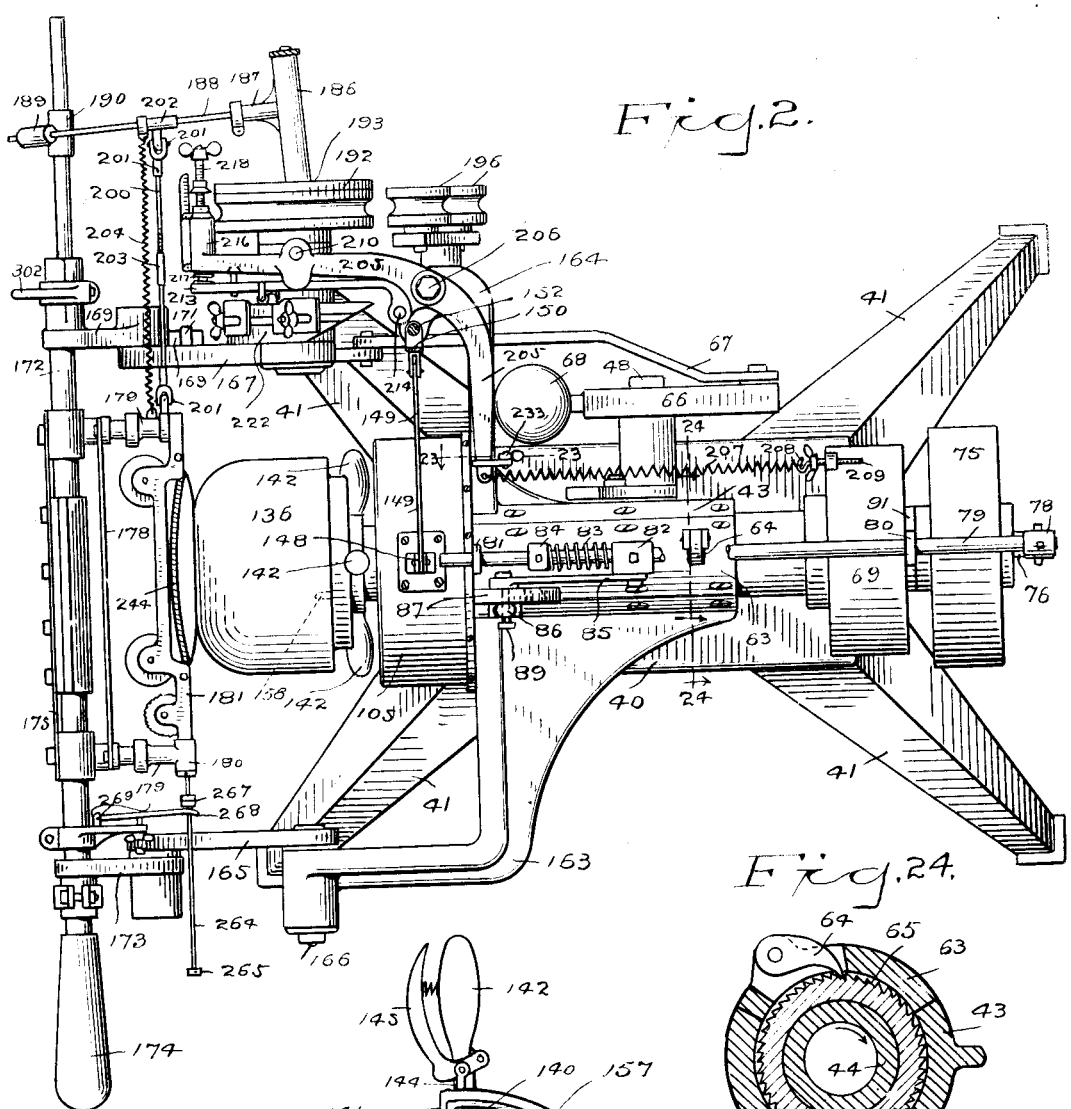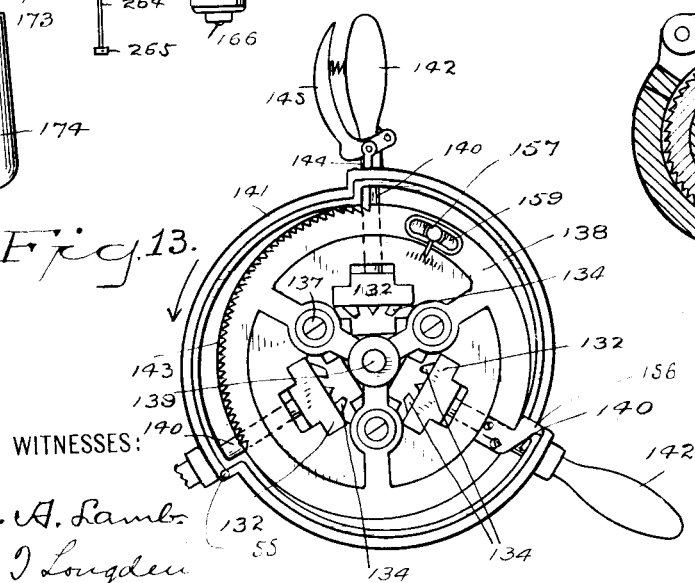

J. F. DORAN.
HAT CROWN POUNCING MACHINE.
APPLICATION FILED MAR. 18, 1911.
1,110,191. Patented Sept. 8, 1914.
9 SHEETS—SHEET 3.
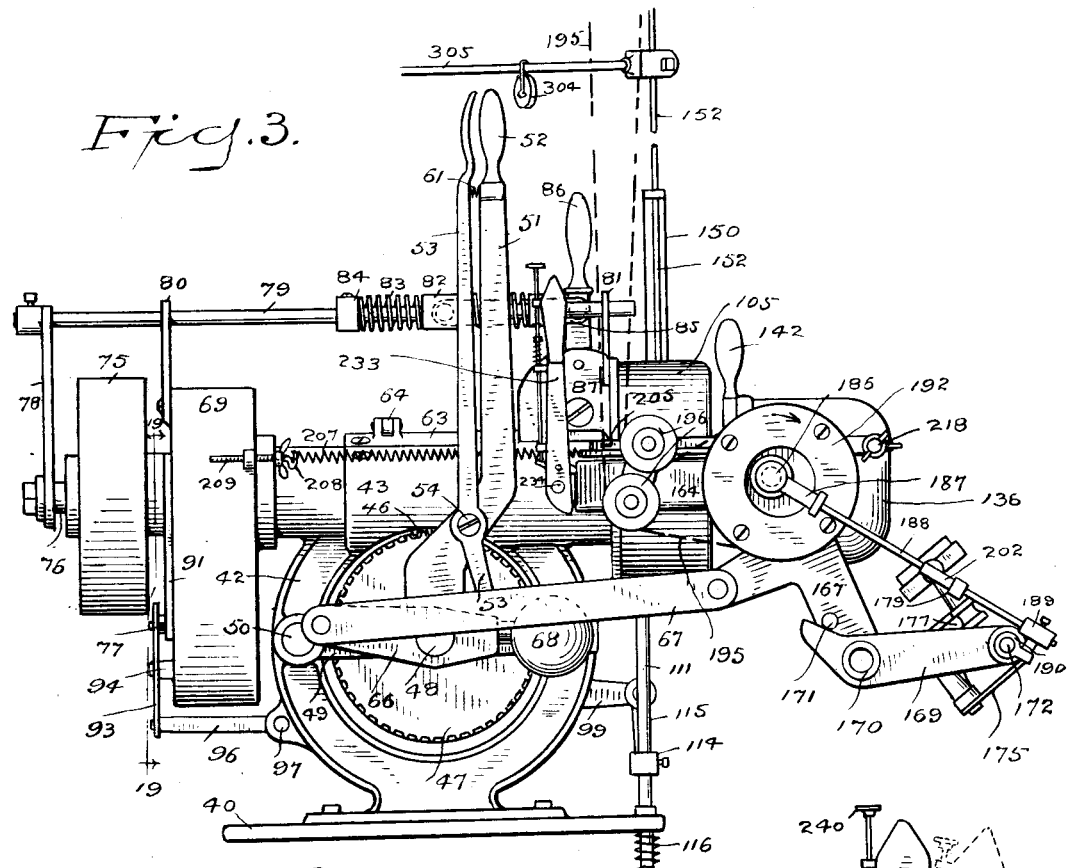
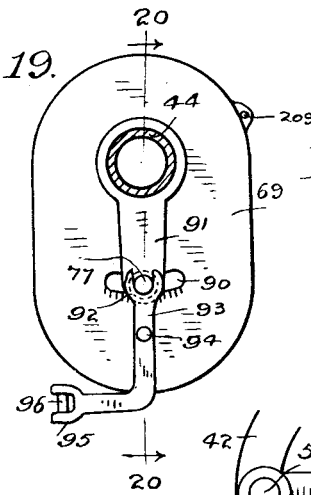
WITNESSES:
H. A. Lamb
M. I. Lougden
INVENTOR
Jas. F. Doran.
BY
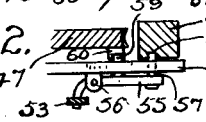
ATTORNEY

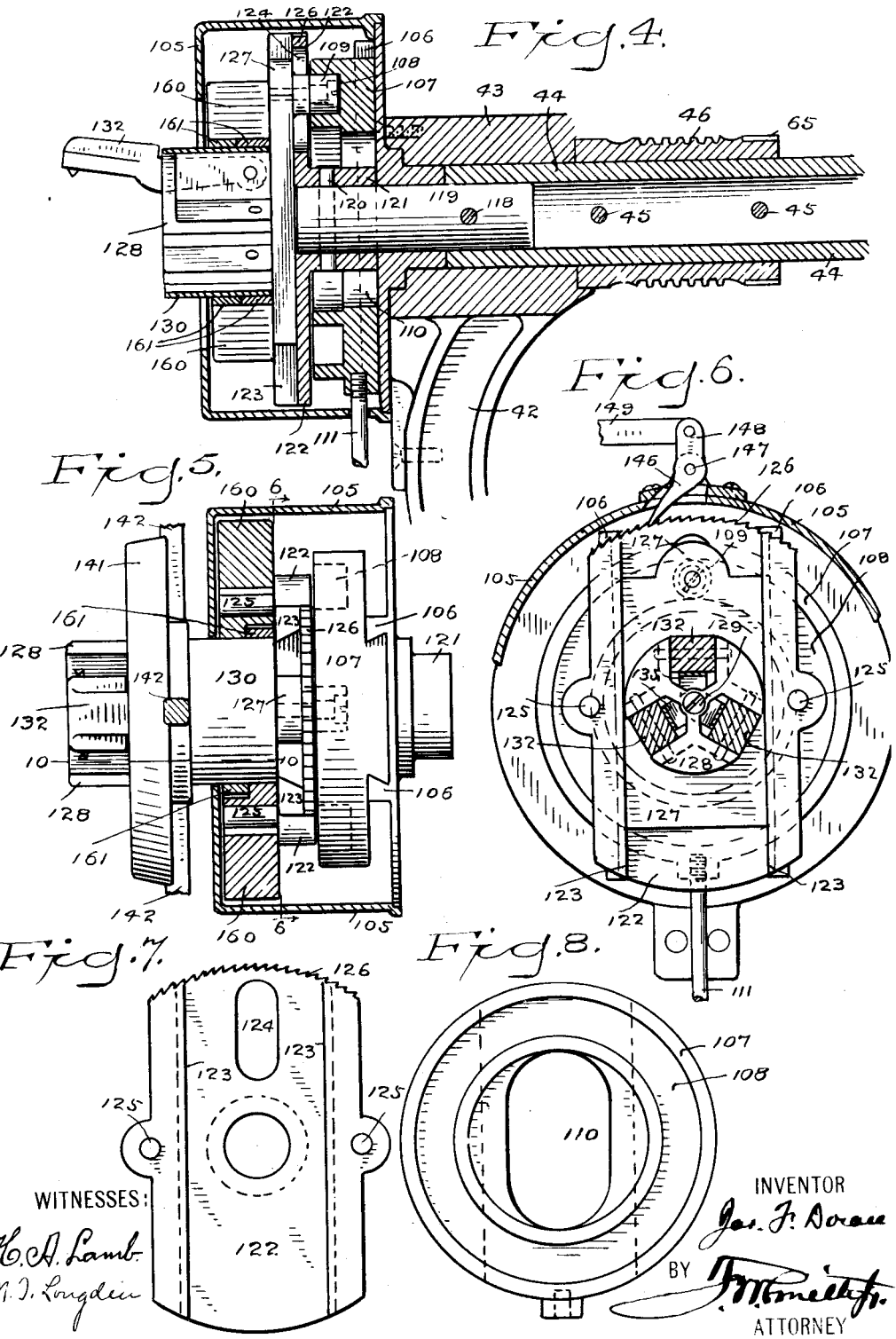

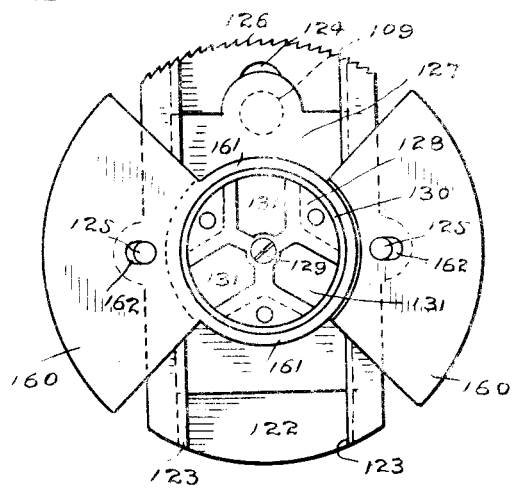
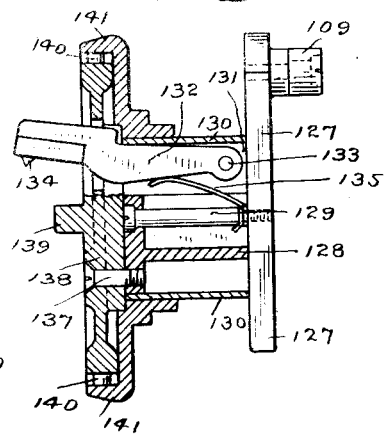
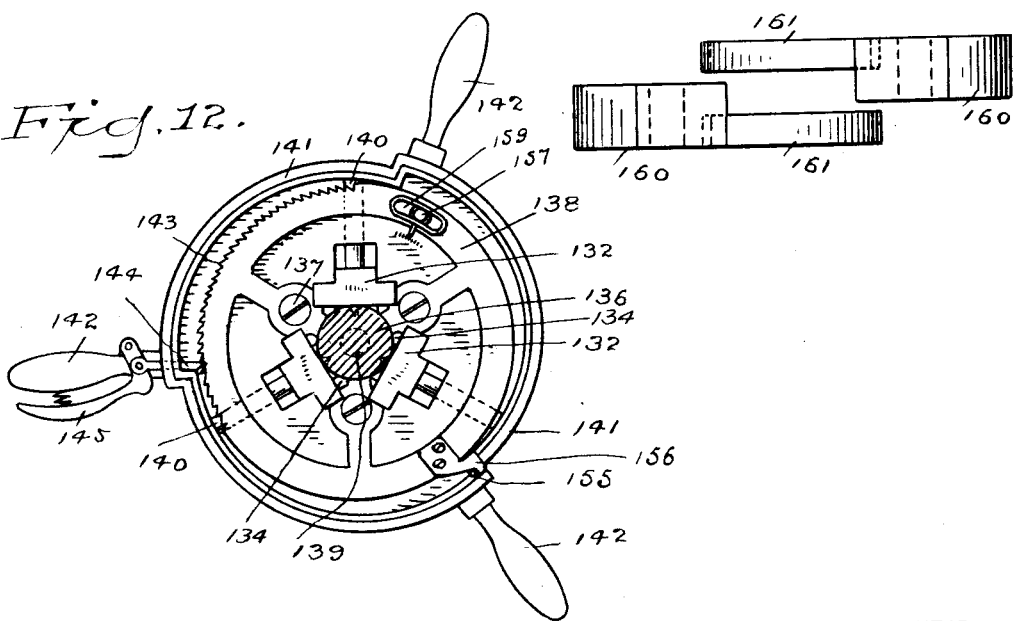

J. F. DORAN.
HAT CROWN POUNCING MACHINE.
APPLICATION FILED MAR. 18, 1911.

1,110,191.

Patented Sept. 8, 1914.
9 SHEETS—SHEET 3.

WITNESSES:
H. A. Lamb
M. J. Longden

INVENTOR
Jas. F. Doran
BY
[signature]
ATTORNEY

J. F. DORAN.
HAT CROWN POUNCING MACHINE.
APPLICATION FILED MAR. 18, 1911.
1,110,191.
Patented Sept. 8, 1914.
9 SHEETS—SHEET 7.
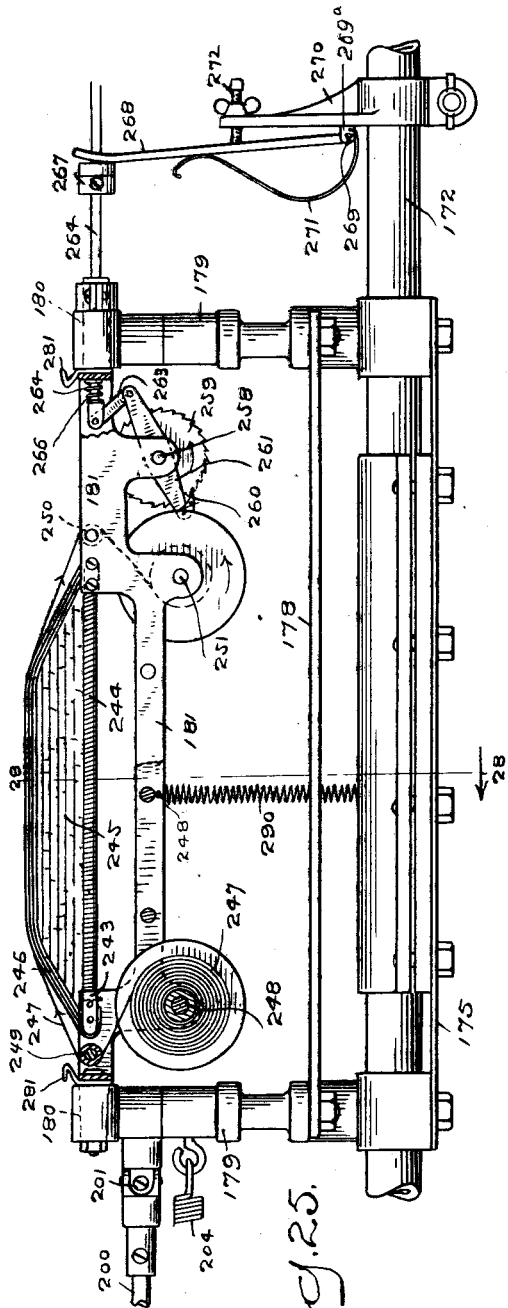
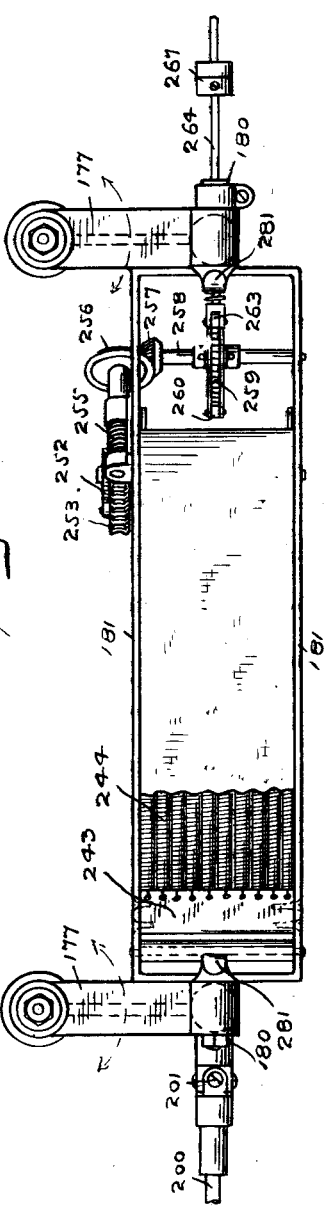
WITNESSES:
INVENTOR
ATTORNEY J. F. DORAN.
HAT CROWN POUNCING MACHINE.
APPLICATION FILED MAR. 18, 1911.
1,110,191.
Patented Sept. 8, 1914.
9 SHEETS—SHEET 8.
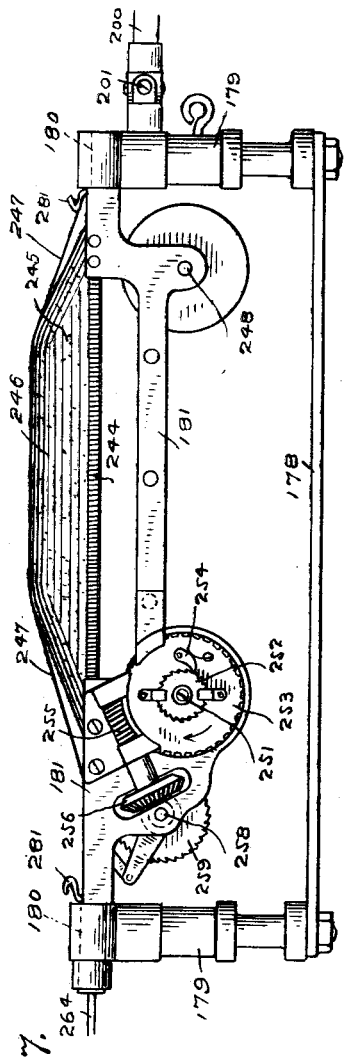
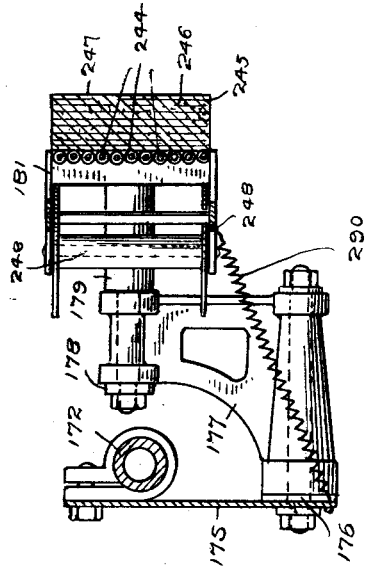
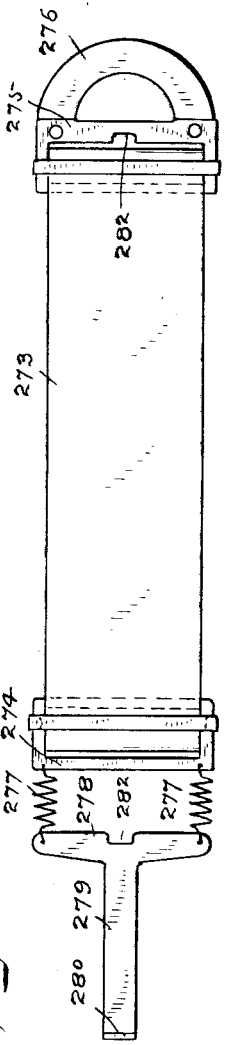
WITNESSES:
INVENTOR
ATTORNEY

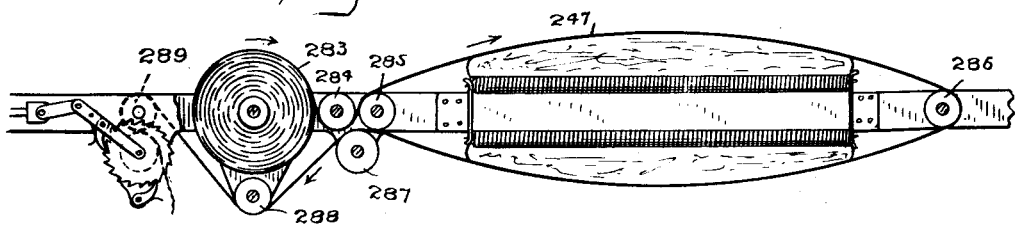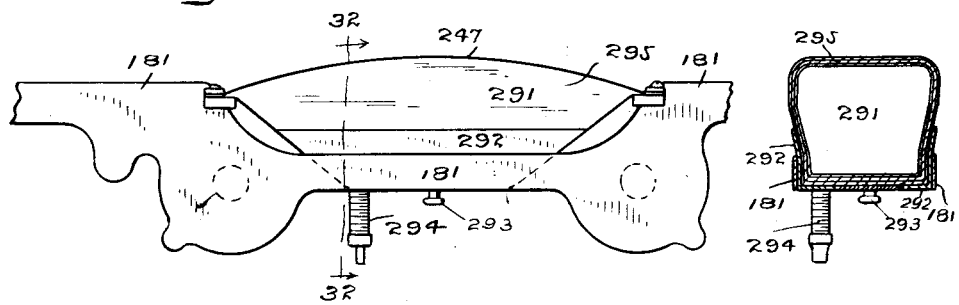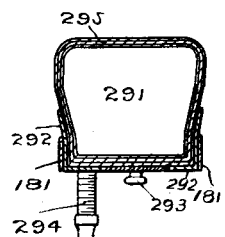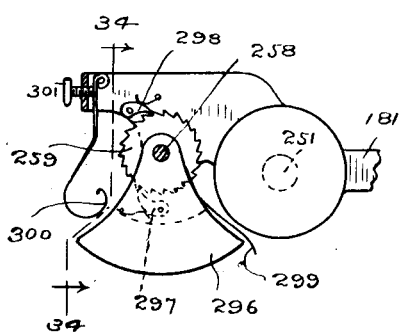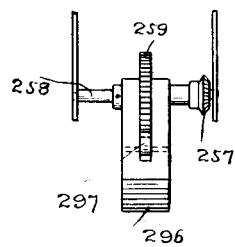

UNITED STATES PATENT OFFICE.

JAMES F. DORAN, OF DANBURY, CONNECTICUT.

HAT-CROWN-POUNCING MACHINE.

1,110,191.        Specification of Letters Patent.        Patented Sept. 8, 1914.

Application filed March 18, 1911. Serial No. 615,228.

*To all whom it may concern:*

Be it known that I, JAMES F. DORAN, a citizen of the United States, residing in the city of Danbury, county of Fairfield, and State of Connecticut, have invented certain new and useful Improvements in Hat-Crown-Pouncing Machines; and I do declare the following to be a full, clear, and exact description of the invention, such as will enable others skilled in the art to which it appertains to make and use the same.

This invention relates to machines for finishing or sandpapering hat bodies, such machines being commonly known as pouncing machines, the hat body being mounted on a block which is slowly revolved during the operations of the member usually called the pouncing pad, such pad having independent movements of its own, reciprocating, revolving, or oscillating, and being also gradually shifted as to its position of operation on the hat.

There are usually two operations of pouncing, first, while the hat crown is circular in shape, the machine used being known as the "rough pouncer." The present machine is especially intended for the final pouncing in the finishing room, after the hat crowns have been given their oval or elliptical shape, but it is capable of use for the rough pouncing although it contains many parts that would be dispensed with for such use, because many difficulties that arise in connection with the pouncing of oval hats do not exist when the hats are circular.

As explained in Letters Patent No. 662,821, granted November 27, 1900, to C. H. Reid, a regular or uniform rotation of an oval hat during the action of the pad results in uneven work and frequently in injury to the hats. Some, but not all, of the difficulties existing prior to the Reid invention, were then overcome by imparting an irregular rotation to the hat. The present machine is a carrying forward of the Reid invention so as to provide a machine that is entirely automatic (but with provisions for some manual controls when desired) and will pounce all portions of oval hat crowns to just the correct degree, even that portion known as the "square" or "danger point."

To render the description of the present machine more intelligible, and to make its advantages more apparent, a brief description of the different portions of an oval hat crown will first be given in order to define brief terms to be used hereinafter. By "crown" is meant, of course, the entire body of the hat above the brim. So much of the crown as extends from the brim to or nearly to the more or less abruptly rounded portion which connects with the top, will be referred to as the "side," and said "side" will be referred to as having "front right quarter," "rear right quarter," "rear left quarter" and "front left quarter." In other words, these four quarters comprise the complete side portions of the hat which is the most oval in form. The "top" comprises that portion from the apex or crown to the said abruptly rounded portion, the word "abrupt" being, of course, for many shapes of hats, a purely relative term. This abruptly rounded portion connects the top and side and, because it is often so sharply rounded as to form almost a right angle, it is referred to as the "square." It is also referred to as the "danger point," because it is the portion of the hat requiring the greatest care in pouncing, to avoid cutting too deeply. It is often so abrupt that the usual pad can touch but a very limited area.

With these prefatory remarks, it may be stated that the principal object of the present invention is to provide a machine which will automatically produce just the proper amount of pouncing upon all these portions of the hat, either by varying the speed of rotation of the hat under the pad, or by varying the rapidity of action of the moving pad so that the operations of the pad will be proportioned to the particular area of hat surface with which the pad is in contact, and to the speed of movement of that particular area.

Further objects are to provide improvements in the various parts of the machine, all of which coact to produce a uniformly pounced hat, as will be explained hereinafter.

To these ends the invention consists in the construction and combination of parts substantially as hereinafter described and claimed.

Figures 17, 18:
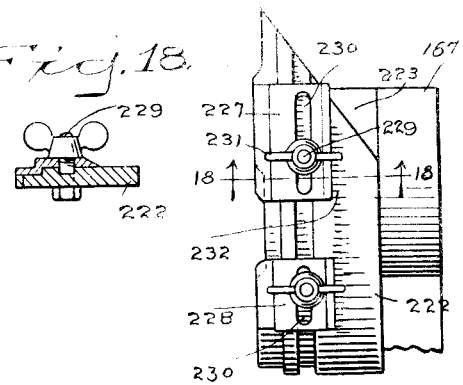
Figure 14:
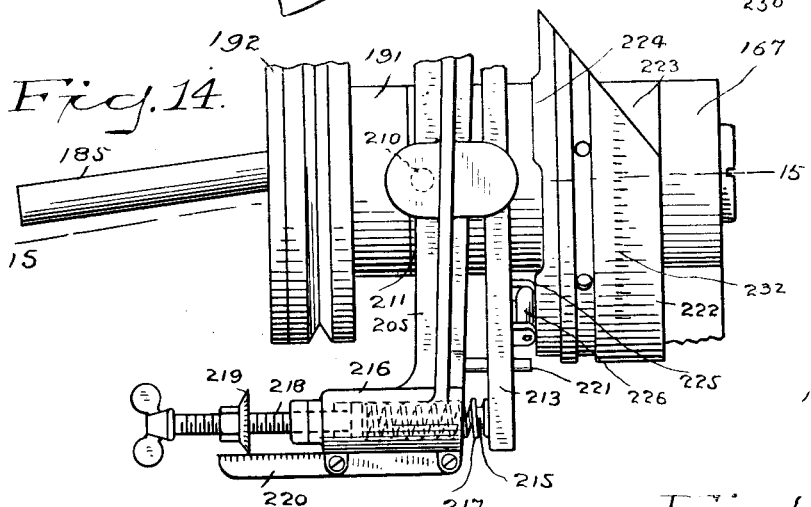
Figure 6:
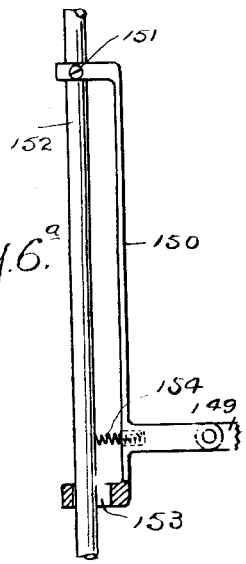
Figure 15:
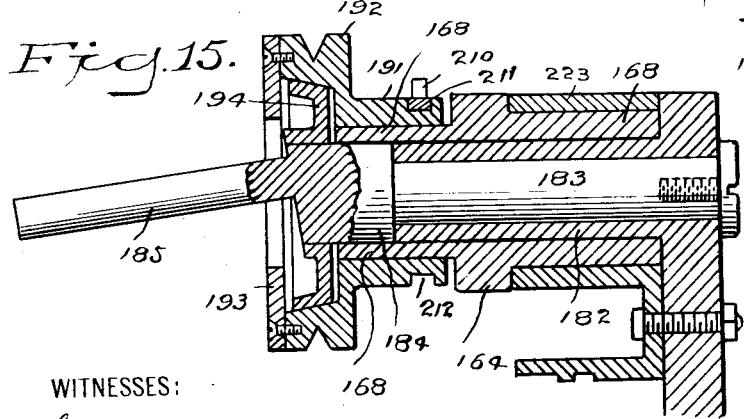

Of the accompanying drawings: Figure 1 is a side elevation of the machine, with the guide rod of the pouncing pad in section—Fig. 1ª represents a detail section on the line 1ª—1ª of Fig. 1—Fig. 2 is a plan view of the machine—Fig. 3 is an elevation from the side opposite to Fig. 1—Fig. 4 represents a detail longitudinal section through the mechanism for vertically shifting the plane of the axis of the chuck—Fig. 5 is a plan view, partly in section, of the mechanism shown in Fig. 4—Fig. 6 represents a section on line 6—6 of Fig. 5—Fig. 6ª is a detail elevation of pawl controlling devices hereinafter described—Figs. 7, 8, and 9, are detail elevations of parts of the mechanism shown in Figs. 4, 5, and 6—Fig. 10 represents a section on line 10—10 of Fig. 5—Fig. 11 is a plan view of the counterbalance weights shown in Fig. 9—Fig. 12 is a detail front elevation of the chuck arm adjusting mechanism—Fig. 13 is a view similar to Fig. 12 but showing the parts in a different adjustment—Fig. 14 is a detail plan of some of the parts shown at the top of Fig. 2, but on a larger scale—Fig. 15 represents a section on line 15—15 of Fig. 14—Figs. 16 and 17 are respectively front and side elevations of the cams for controlling the speed of reciprocation of the pad or tool—Fig. 18 represents a section on line 18—18 of Fig. 17—Fig. 19 represents a section on line 19—19 of Fig. 3—Fig. 20 represents a section on line 20—20 of Fig. 19—Fig. 21 is a detail elevation of parts shown near the center of Fig. 3—Fig. 22 represents a section on line 22 of Fig. 21—Fig. 23 represents a section on line 23—23 of Fig. 2—Fig. 24 represents a section on line 24—24 of Fig. 2—Fig. 25 is an elevation, partly in section, of the pouncing pad and its support—Fig. 26 is a plan view of the same, a portion of the sandpaper strip being removed—Fig. 27 is a view similar to Fig. 25, but taken from the opposite side—Fig. 28 represents a section on line 28—28 of Fig. 25—Fig. 29 is a plan view of an attachment for the pad—Fig. 30 is a view similar to a portion of Fig. 27, but illustrating a modification of pad structure—Fig. 31 is a view similar to Fig. 30 showing another modification—Fig. 32 represents a section on line 32—32 of Fig. 31—Fig. 33 is a detail view of a modified form of strip feed—Fig. 34 represents a section on line 34—34 of Fig. 33.

Similar reference characters indicate the same or similar parts in all of the views.

The base or table 40 of the machine is shown as supported by suitable legs 41, and, in turn, supports the frame of the machine, said frame comprising a circular portion 42 and an upper horizontal portion 43 which forms a bearing for a tubular shaft 44 (Fig. 4). Secured on said shaft, as by pins 45, is a worm 46 which meshes with and drives a worm wheel 47 (Figs. 1, 3, 21 and 22), the latter being secured to a stud shaft 48 mounted in a bearing provided in a lever 49 pivoted at 50 to the frame 42.

Rising from the lever 49 is an upright arm 51 having a handle 52, and a lever 53 is pivoted to said arm at 54. The lower end of lever 53 is connected to an outwardly turned end of a small lever 55 (Figs. 21 and 22) which is pivoted at 56 to the lever 49. The other end of lever 55 carries a pin 57 adapted to engage a recess 58 in the side of frame 42 and between the pin 57 and pivot 56 is a lug 59 in the path of a cam faced lug 60 carried by the worm wheel 47. A spring 61 between arm 51 and lever 53 tends to hold the pin 57 in recess 58 and lock lever 49 in position to hold the stud shaft elevated and the worm wheel in mesh with worm 46. This engagement can be released at any time by the operator, by simply closing the lever 53 against arm 51 and letting said arm and the lever 49 swing on pivot 50 until the outer end of lever 49 contacts with a fixed lug 62 projecting from the frame. Automatic release of said engagement is effected by the cam lug 60 engaging lug 59 of lever 55, this occurring at the end of an operation on a hat. The operator restores the engagement by means of arm 51, the pin 57 reëntering recess 58. The construction and operation are similar to, but not identical with, features in the Reid patent above mentioned, it being understood, of course, that the shaft 44 is constantly running, although with a variable speed, as hereinafter described.

As shown in Figs. 1, 2, 3, and 24, an upper section of the shaft bearing 43 is removable as at 63 to give access to the interior. Said section is formed with an opening in which is pivoted a pawl 64. One end of the worm 46 (Figs. 4 and 24) is formed or provided with a ratchet 65 to coöperate with said pawl in preventing the shaft from being turned backwardly when the chuck is being manipulated in the manner hereinafter described.

Fixed to the stud shaft to rotate therewith and with the worm wheel, is a crank 66 which is connected by a link 67 with the swinging frame of the pouncing pad or tool, to actuate said frame as hereinafter described. To prevent a dead center position of the crank and link, said crank is formed with a rearward extension having a weight 68.

Suitably secured to the rear of the frame is a casing 69 which contains differential power-transmitting gearing 70, 71, 72, 73, 74, (see Fig. 20 in connection with Figs. 1, 2, 3, and 19) interposed between the bottom shaft 44, and a driving-band pulley 75, a controlling slide 76 being employed to either cause the pulley to drive the shaft at a regular uniform speed or with a differential speed. As these members are substantially the same as the mechanism shown at the left of Fig. 10 of the Reid patent No. 662,821, and serve substantially the same purpose, a more detailed description will be unnecessary herein. But in the present invention, the stud shaft 77 of the gear 73, instead of being manually fixed in laterally adjusted position, as in said patent, is automatically adjusted by mechanism presently described. The arm 78 which controls the in and out positions of the slide 76 is carried by a slide rod 79 mounted to reciprocate in guides or bearings 80 and 81. A sleeve 82 is slidably mounted on the rod 79 and is held yieldingly in position longitudinally thereof by springs 83 interposed between the ends of said sleeve and collars 84 secured on said rod (see Fig. 1). A link 85 connects said sleeve with a lever 86 pivoted to a frame bracket 87 the latter having a series of holes 88 either one of which may receive a locking pin carried by a hand controlled lever 89 of well known form, whereby the lever 86 may be set in either one of a plurality of positions. This construction saves time for the operator because, when he wishes to shift the controlling slide 76, he can at once put the lever 86 in its desired adjustment and if the coacting parts of the adjusting members of the differential gearing are not in relative position to inter-engage, the spring 83 which has been put under compression by the shifting of the sleeve 82 will effect that inter-engagement as soon as, during the rotation of the gearing, a relative position is reached to permit such inter-engagement. Another improvement in this portion of the machine, over the said Reid patent, is that the lateral shifting of the stud shaft 77 to vary the differences between the alternating fast and slow speeds of the shaft 44, is effected automatically, so that, as the pouncing pad or tool reaches portions of the hat that are less oval in contour, the shaft will rotate with less and less variation of speed until finally it rotates at a uniform speed as the tool reaches the apex of the hat. To effect this result, the stud shaft 77, which projects through an arc slot 90 in the casing 69 (see Fig. 19 in connection with Figs. 1 and 20), also passes through a pendant arm 91 hung on shaft 44, and is engaged by a yoke 92 at the upper end of a lever 93 pivoted at 94 and having a laterally extending lower forked end 95 which is engaged by the rear end of a lever 96 pivoted at 97 to the frame 42 and having a link connection 98 with a lever 99 pivoted at 100 to the frame and having a roll 307 engaged by a cam 102. Said cam acts through the lever 99 to perform another function hereinafter described, and for the present it will only be mentioned that it is secured to rotate with the worm wheel 47 and is preferably adjustable relatively thereto, as by having its hub mounted on the stud shaft 48, a screw or threaded stud projecting from the worm wheel through an arc slot 103 in the cam, a wing nut 104 being employed to secure the cam in its rotative adjustment about shaft 48.

An especially important feature of the present invention comprises means for causing the axis of rotation of the hat supporting block to rise and fall while the pad or tool is operating on oval portions of the hat, so that the surface area under treatment will be in a given plane and not constantly changing. This results in more uniform treatment than where the pad or tool is constantly shifting to follow the oval contour of the hat and consequently has its operation affected by its momentum and inertia and the changing positions of any counterbalancing mechanism employed. I will now describe said improved means, referring particularly to the detail Figs. 4 to 13 inclusive:

Secured to the front of the frame 43 is a casing 105 having the inner face of its rear wall formed or provided with ways 106 for a vertical slide which, as a whole, will be referred to as the adjustable eccentric 107. This term is employed because the groove 108 in its face is preferably circular, but since the slide is adjustable, said groove is adapted, when not concentric with the axis of shaft 44, to act in a manner similar to an eccentric or circular cam on the roll 109, as presently more fully described.

The slide or eccentric 107 is formed with a vertically elongated opening 110 and connected to its bottom is a rod 111 which (see Figs. 1 and 3) extends down through the table 40 and is connected to a foot lever 112 pivoted at 113. It is to be understood that opening 110 may be elongated horizontally instead of vertically under certain conditions and the term laterally is intended to cover a lateral elongation in any direction with respect to the axis of the driving shaft 44. A collar 114 secured to the rod is connected by a link 115 with the lever 99. A spring 116 interposed between the table 40 and a collar 117 on the rod 111, tends to hold the parts normally in the positions shown in Fig. 1, and with the roll of lever 99 in contact with the cam 102. It will now be understood that the cam 102 controls the vertical position of the eccentric 107, and also that the operator can, at any time, by depressing the outer end of the treadle 112, raise the rod 111 and the eccentric 107. The proportions and connections are such that when the latter is done by the operator, or when the highest portion of the cam 102 is acting on the lever 99, the member 107 is adjusted to such position that its groove 108 is no longer concentric to the axis of shaft 44, and the hat block will be eccentric with said axis of the shaft as hereinafter explained.

Secured in the front end of shaft 44, as by a pin 118, is a short rod 119 which constitutes an extension of said shaft 44, said extension passing into the casing 105 and having fastened to it, as by a pin 120, the hub 121 of a guide plate 122, said hub passing through the opening 110 of the member 107. The guide plate 122 is formed or provided with parallel ways 123, an elongated opening 124, two pins 125 on opposite sides of its center and with a peripheral ratchet-toothed portion 126. The roll 109, hereinbefore referred to, is carried by a pin projecting rearwardly from a slide 127 that is mounted in the ways 123 of plate 122, said roll passing through the opening 124 in plate 122 into the groove 108. The slide 127 carries the hat block chuck as presently described. As will now be understood, the guide plate 122 must rotate with the hollow shaft, and since the walls of its opening or slot 124 engage the roller 109 of slide 127, the said slide also will be rotated. And since said roller 109 also enters the groove 108, the slide 127 and its chuck will be controlled in its position and movements by the eccentric. If the latter occupies a central position, the chuck will be in alinement with the axis of the shaft, and if the eccentric be shifted upwardly the chuck will be lifted by the guiding action of the groove 108 on roller 109.

I will now describe the block chuck carried by the slide 127. A casting 128 is carried by slide 127 and is secured thereto by center bolt 129, and said casting is peripherally inclosed by a sleeve 130, and is formed with three radial recesses 131. In each recess is a jaw or hat block gripper 132 pivoted to the casting at 133, the outer end being preferably provided with spurs 134, and normally pressed outwardly by a spring 135. The spur ends of the jaw are adapted to be closed inwardly to grip the hub portion of a hat block 136, as shown in Fig. 12, by actuating mechanism which I will now describe.

Secured to the front of the casting 128 by screws 137, is a circular plate 138 having radial slots through which the jaws pass, said plate having a center pin or lug 139 to enter a hole in the center of the hat block hub 136. Mounted to reciprocate radially in the plate 138 are three pins 140. The inner ends of these pins 140 bear on the jaws and force them inwardly against the pressure of springs 135 so as to grip the hat block, this inward movement being effected by a cam ring 141 the hub of which is mounted rotatively on the sleeve 130. Rotation of the ring 141 from the position shown in Fig. 13 to or toward the position shown in Fig. 12 causes its three internal cam surfaces to act on the pins 140 as just described. Reverse rotation permits the springs 135 to open the jaws. The ring 141 is preferably provided with three handles 142 for convenience of operation. To lock this ring in block-gripping position, a portion of the periphery of the plate 138 is formed with ratchet teeth 143 which are engaged by a detent pawl 144 that is so conected to a spring operated finger lever 145, pivoted adjacent one of the handles 142, that when said finger lever is grasped and closed toward such handle, the detent pawl will be released from the ratchet to permit the cam ring to be returned to open the jaws.

When the cam ring is being turned in the direction of the arrow in Fig. 13, to grip a hat block, the chuck is held stationary owing to the pawl 64 (Fig. 24), no matter how much force is necessary for tightly clamping the block. It is to be understood that when the machine is in operation, the shaft 44 and ratchet 65 rotate in the direction of the arrow in Fig. 24. During the clamping action of the cam ring the detent 144 rides over ratchet 143. To hold the plate 122 from being rotated to the right, when the cam ring is being operated to release the jaws, a pawl 146 is mounted to be manually engaged with the ratchet 126 (see Fig. 6) which pawl 146 is shown in engagement with ratchet 126. Normally, however, when the machine is in operation, said pawl remains disengaged from said ratchet. The pawl is pivoted at 147 and has an arm 148 connected by a link 149 (see also Figs. 2 and 6ª) with a hand piece 150 pivotally connected at 151 with a fixed upright rod 152 and having a loop 153 at its lower end encircling said rod. A spring 154 interposed between the rod 152 and swinging hand piece exerts a thrust on link 149 and holds pawl 146 raised. When the operator wishes to release the hat block, with the left hand he grasps rod 152 and hand piece 150 and pulls link 149 and throws pawl 146 down to the position shown in Fig. 6. Then with the right hand he grasps finger lever 145 (Fig. 12) and its adjacent handle 142, first releasing detent 144 and then rotating the cam ring to release the jaws from the block.

A pin 155 projecting from the cam ring (Figs. 12 and 13) coacts with a stop 156 carried by the face plate 138 to prevent the cam ring from being rotated far enough to carry the detent 144 beyond the end of ratchet 143.

It is, of course, essential that the hat block shall be so positioned when gripped by the jaws that the major and minor axes of the hat will be presented at proper times to the action of the tool. For this purpose, I provide a pin 157 carried by the face plate 138 to enter a hole which is formed in the back of the body of the hat block, as indicated by dotted lines 158 in Fig. 2. The face plate is provided with an arc slot 159, and the pin 157 may be adjustably set along said slot, so that the accurate position for the hat block may be determined without having to make any change or experiments in connection with the gearing in the casing 69.

During the operation on the hat, the block rotates of course many times while the tool is gradually being shifted from the brim to the apex of the hat, or vice versa, and the block is shifted off the center of rotation, and return, twice during each revolution. This shifting action is synchronous with the rotation, and it may be here noted that I use the term "synchronously" to define an action which is in tune with the action of another part. I provide mechanism for counterbalancing the weight of the parts when off center, as follows (see Figs. 4, 5 and 9):

Pivoted on the pins 125 of plate 122 which has no vertical movement, are two counterweights 160 having hub portions 161 mounted on the sleeve 130. The latter of course partakes of all vertical movements of the chuck slide 127. The openings in the counterweights for the pins 125 are formed as slots 162 so that, as the sleeve shifts to and from center, the hubs 161 are acted upon to swing the greater masses of the counterweights in a direction opposite to the direction of movement of the chuck. The effect of these counterweights is chiefly desirable when running at high speed, because it neutralizes the vibration that would otherwise occur.

Having now described the mechanism by which the hat on its block is caused to rotate in such manner that the portion presented to the operation of the pouncing pad or tool (which, with the structure illustrated, will be the uppermost portion) will be traveling in a uniform plane or location, I will proceed to describe the pad or tool and its operating mechanism. It may be stated that, in a general way, the pad is shifted and operated in a manner similar to that in the Reid patent referred to; but the improvements thereover are extensive, as will presently become apparent.

Projecting from opposite sides of the frame 43 (Figs. 1, 2 and 3) are two rigid arms 163, 164, the latter supporting the rod arms 152. These two arms, as will presently appear, afford supports for both ends of the pad mechanism, thus enabling steadier and more uniform pouncing to be produced than if said mechanism were supported at one end only as in the Reid patent. A link arm 165 is pivotally connected at 166 with rigid arm 163, and a T-lever 167 is pivotally connected with rigid arm 164. The hub 182 of said T-lever is mounted to oscillate within a tubular bearing portion 168 (Fig. 15) which forms the front end of arm 164, the longitudinal center of the hub 182 being in alinement with the pivot 166 of link arm 165. The short arm of the T-lever 167 is connected by the link 67 with crank 66 so that, as shaft 48 rotates, the T-lever is actuated to swing the pouncing tool as hereinafter described. A lever 169 is pivoted at 170 to the T-lever and has its rear end extending under a stud 171 of said T-lever to limit the outer or lower position to which the pad may fall at the end of the operation.

The rod 172 for the pouncer frame is mounted at one end in the outer end of lever 169, and at the other end in an arm 173 supported by the link arm 165. A handle 174 is preferably provided at one end, or each end, of the rod 172. Adjustably clamped upon rod 172 (see Figs. 1, 2, 3, 25, and 28) is a plate 175 of spring metal. To the projecting ends of this plate, near its lower edge, are secured two posts 176. Each post has a swinging wing 177, and the outer ends of the wings are connected by a link 178 so they will swing or oscillate in union. Mounted in the free ends of the wings are posts 179 in the ends of which are mounted swivels 180 for the pad base frame 181 (see also Figs. 26 and 27), so that it will be clear that said frame and all parts carried thereby will be capable of an oscillatory movement around a common axis.

By the adjustable clamping of the plate 175 on the rod 172, I provide for the pouncing of hat crowns whose depth varies so that the brims are at more or less distance from the bottom of the hat block.

During the operation of the machine, the tool is gradually shifted, by the crank 66, link 67, and the T-lever 167 and the parts operated thereby, to cause the tool to operate on different portions of the hat surface between the brim and apex of the crown, the hat itself being slowly revolved. This so called "traversing" movement of the tool over the surface of the hat may be either in the direction from apex to brim or from brim to apex and may be accomplished either by swinging the tool with respect to the hat or swinging the hat with the respect to the tool and the term traversing is broadly used herein although there are specific advantages in the construction herein described. The tool of course has independent surface operating movements which, with the structure illustrated, are reciprocatory ones. If the tool were oscillated or revolved, instead of reciprocated, it would still have surface-operating movements. I will now proceed to describe how these movements are effected in the embodiment of the invention illustrated, and how the speed thereof may be automatically or manually varied to suit the particular portion of the hat surface area with which it is in contact, in order to obtain uniform effects and avoid cutting too deeply at the "square" or "danger point" or toward and at the apex.

Mounted within the hub 182 (Fig. 15) is a stud shaft 183 having a head 184 the outer face of which is inclined. Projecting eccentrically from the head is an inclined wrist pin 185. Mounted on the pin 185 is a sleeve 186 having a lateral projection 187 (Figs. 2 and 3) in which is secured an arm 188. The outer end of the arm 188 is supported and guided in a sleeve 189 which is pivotally connected to a sleeve 190 that is reciprocally guided on the rod 172. The rotation of the head 184 and its wrist pin causes the arm 188 to oscillate in a manner similar to that of the mechanism shown in Fig. 4 of the Reid patent mentioned.

Mounted to rotate on the tubular bearing portion 168 is the hub 191 of a pulley 192 having a cone-shaped recess partly covered by a circular plate 193. Shrunk on or otherwise rigidly secured to the head 184 is a cone disk 194. The pulley has a restricted lateral movement so as to release it from the cone disk 194, and also to affect the speed of rotation of the head and its wrist pin according to the pressure with which the pulley, when driven, is held against the cone disk, thus controlling the speed of the reciprocations of the pad which is operated by the arm 188 as presently described. The pulley is driven by a belt 195 passing around idlers 196 (Fig. 3) supported by arm 164. The belt is driven by a variable speed mechanism under the manual control of the operator, capable of changing the speed very greatly, such as from 40 to 1000 revolutions per minute. I have not illustrated such mechanism since it is very ordinary and the means for manually changing the speed merely consists of the usual overhead handles connected by cords or wires to such mechanism.

Motion is transmitted from the vibrating or oscillating arm to the pad, by means of a link 200 connected by universal joints 201 with a sleeve 202 adjustable on arm 188, and with one of the wings 177 (see Fig. 2 in connection with Figs. 25, 26, and 27). The link 200 is in two parts joined by a sleeve 203 which is secured to one part and threaded upon the other part. This avoids the twisting strain that would affect a one-piece link, and also enables the exact length to be obtained by adjustment prior to complete assembling of both universal joints. Another reason for adjusting the length of the rod or link 200 is to cause the pad to have more or less of a lateral movement as it reciprocates. For instance, if adjusted so that the wings 177 swing to an equal amount each side of the position shown in Fig. 26, then the lateral movement of the pad will be slight. If the link is lengthened out so that the position of the wings in said figure indicates the end, instead of the middle of the stroke, then the pad will move much farther toward a line connecting the pivots of the two wings 177, thus causing an action on the hat in a curved path that is as much sidewise as lengthwise.

Preferably I do not rely on the link 200 alone and the connection described, because the frequent extremely rapid operations cause noise and wear at the joints. Consequently I employ a spring 204 connecting the sleeve 202 and the wing 177, the spring having a sufficient strength to prevent rattling, up to a high speed such as 1000 strokes per minute. This provides a light connection that possesses less inertia than if the link and joints were made heavy enough to sustain both push and pull.

I will now describe the mechanism which automatically varies the speed of reciprocation of the pad according to the portion of the hat being operated upon, so that said speed will be much slower on the "danger point" of the hat or where the convexity is greater, and comparatively slow as the pad approaches the apex of the crown.

An elbow lever 205 (Fig. 2) is pivoted at 206 to the frame arm 164 and has a spring 207 connected to its rear end, the other end of the spring being connected by a swivel hook 208 to a screw 209 adjustable in gear casing 69 to enable the tension of said spring to be adjusted. Near its outer end, the lever 205 is connected by a pin 210 (Figs. 2, 14, and 15) with a shoe 211 fitting an annular groove 212 in the hub 191 of the pulley 192, so that the spring 207 has a constant tendency to draw the pulley away from and out of driving contact with the cone 194. A supplemental arm 213 is pivoted to the lever 205 at 214 and has a stud 215 at its outer end. The end of lever 205 is provided with a barrel 216 containing an expansion spring 217 the outer end of which fits over stud 215, and the pressure of said spring may be varied by a screw 218 the inner end of which bears against a disk indicated by dotted lines in Fig. 14, said disk bearing against the inner end of the spring 217. The screw 218 has a disk 219 adjustably mounted thereon, to coöperate with a scale 220 carried by the end of lever 205, to indicate such changes as may be desirable in the strength of the spring. A pin 221 is shown as projecting from the lever 205 to guide the arms 213.

To actuate the lever 205 against the tension of spring 207, to shift pulley 191 and cause it to grip the cone 194 more or less tightly to vary the speed of operation of the pad according to the amount of slip permitted between the cone surfaces, I provide a cam structure which I will now describe.

222 is a segment of cylinder (see Figs. 14 and 15) having a hub 223 mounted on bearings 168 and connected to the lever 167 so as to oscillate therewith. One edge of said segment is cut away to form two cam rises 224, 225, or any desired number thereof which coact with an anti-friction roller 226 carried by arm 213 so as to actuate lever 205 in a direction to cause the higher speed of reciprocation to be imparted to the pad. The recess between said cam rises permits spring 207 to shift the lever to reduce frictional contact between the cones and provide for a reduced speed of said reciprocations. This recess is so positioned that in the timing of the operation of the machine, this reduced speed occurs while the T-lever is swinging the pad frame over the "square" or "danger point" of the hat. The position where this "square" or other tender part comes, and its width, varies with different styles of hats, and I therefore make the cams variable. Referring chiefly to Figs. 16, 17, and 18, the periphery of the segment 222 is formed with a guiding rib or groove, or both, along which slidable cam segments 227, 228, may be adjusted as by means of screws 229 passing through slots 230 in the segments. The screws may be fixed in the main segment, and have wing nuts 231 to clamp the small segments in adjusted positions. The main segment 222 is provided with a scale 232 to coöperate with the corner of the small segments, or with other suitable means carried thereby, to indicate the proper setting of the said small segments for certain shapes of hats. These small segments are removable and may be replaced by others of different shapes, if desired. As shown in Fig. 17, the cam segment 227 does not project laterally quite so much as segment 228; said segment 227 is the one that will be in contact with rolls 226 after the pad has passed the "square" and is passing down toward the apex of the crowns when less speed of reciprocation of the pad is wanted than on the sides of the crown. The cams can, of course, be of any shape to control the speed of the pad desired, from its highest down to zero, it being understood that when there is nothing to bear on roller 226, the spring 207 acts to completely separate the cones. As the power which drives pulley 192 is entirely independent of that which operates the rest of the machine, the rotation of the hat block and the swinging of the pad frame, can be stopped, and the pad caused to operate on a given area of the hat if it should need it, and all reciprocations of the pad may be stopped while the hat is put through an entire operation, this being sometimes desired after the pouncing, in order to lay all the fibers one way.

The speed of reciprocations of the pad may be manually controlled at any or all times by means of the screw 218, to meet manual conditions, independently of the segment cam control. And whenever the cones are in driving contact at all, the said speed may be manually varied or entirely stopped, by the operator pulling one of the overhead handles. The scales 220 and 232 enable a record to be kept of the settings for particular shapes or styles of hats, so that when any particular style comes again to the operator, he can refer to his records of the work on previous lots of that style, and make his settings accordingly. If the two segments 227, 228, are set close together, then there will be no variations in speed of the pad; this is sometimes desired for full round corners, and when the hat body is heavy so that there will be no danger of cutting through any part of it.

When the machine is operating normally, it is sometimes desirable to stop the pad reciprocations quickly. For this purpose, and others presently described, I provide a lever 233 (Figs. 2, 3, and 23) pivoted at 234 to the frame arm 164, and having a hook 235 extending over the lever 205. A spring 236 tends to hold the lever in the dotted lines position of Fig. 23. Pivoted to the lever 233 is a pawl 237 having its tip end heaviest. Sliding in lugs 238 of lever 233 is a rod 239 having a finger pin 240 at its upper end. A spring 241 holds this rod normally raised. A small tension spring 242 may connect the lower lug 238 and the outer end of pawl 237 to aid in throwing said pawl to its full line position. If it be desired to stop the pad quickly, the lever 233 is shifted from its dotted line position to its full line position, the pawl 237 dropping down behind the frame arm 164 and the hook 235 moving to a position to cause lever 205 to separate the cones. To return the lever 233 to dotted line position, the operator depresses rod 239 to release pawl 237, and spring 236 then throws said lever over and releases lever 205. This hand lever 233, manipulated in the manner described, will also enable the operator to merely reduce the pad speed if he wishes to, because he need shift said lever but slightly; and especially is it useful when it is desired to start work at the band of the hat while the pad is stationary. And it can be used to rock the lever 205 so that the pad will not reciprocate, when it is desired to run over the hat merely to lay the fibers.

In order to produce uniform pouncing or equivalent work, it is essential that the pad or tool shall be so constructed that its operation will be spread over a considerable area of the hat, even when working on the "square." In the drawings I illustrate several forms of pads so constructed that their operative faces will be equally yieldable in all portions of their area, or, in other words, equally pliable in all directions. For this purpose I, at present, prefer to employ a pneumatic backing, but first I will describe the structure shown in detail in Figs. 25 to 29 inclusive. Near each end of the pad base frame 181 is a cross brace 243. Coiled springs 244 are connected at their ends to said brace, said springs being parallel and of equal tension. They are similar to some kinds of bed bottoms in capacity for equal yielding at all portions of their area, and of course might be replaced by other equivalent forms of bed bottoms, whether a series of upright coiled springs, or even a wide rubber band. Said springs 244, or their equivalent, form a yielding base or support for a plurality of layers 245 of felt, sponge, rubber, or other suitable material, which layers may be covered, if desired, with one or more strips of fabric 246 attached to the cross braces 243, to constitute the pad proper, which pad is faced with pouncing paper of the usual character. Broadly speaking, the strip 246 might be of pouncing material, but I prefer to provide a structure which automatically preserves the uniformity of the pouncing ability of the pad by gradually feeding a strip of pouncing material from one end to the other thereof. This may be effected by mounting a roll of sandpaper 247 or other material, on a spindle 248, said paper then passing freely over a roller 249, over the elastic body, over a roller 250 at the other end of the base frame, and to a shaft 251 having a ratchet 252 fixed to it. A worm wheel 253 is mounted on said shaft and has a pawl 254 that is spring-held against the ratchet. This enables the first winding of the strip to be effected by hand, after the end of the strip is attached to the shaft 251, so as to draw the strip taut. This first winding may be performed by means of a key or small wrench engaging a square end of shaft 251. Of course such key may be used to effect, by hand if desired, a more rapid shifting of the strip than will be effected by the automatic feed now described.

Meshing with the worm wheel 253 is a worm 255 carried by a shaft having a bevel gear 256 meshing with a bevel pinion 257 secured to a shaft 258. Also secured on shaft 258 is a ratchet 259 which is engaged by a pawl 260 carried by one end of a lever 261 mounted on shaft 258 and having its other end connected by a link 263 with a slide rod 264 mounted to reciprocate in a bearing provided therefor in one of the swivels 180, and having a button 265 at its outer end (Fig. 2). A tension spring 266 acts as a shock absorber when the rod 264 is returned quickly, and also tends to hold the slide in approximately the position shown in Fig. 25, and it will be obvious that if the slide be pushed toward the left (toward the pad), it will cause the strip to be fed, owing to the gearing just described, the spring 266 returning the slide.

Manual operation of the slide, by the button 265, may effect manual feeding of the strip if it be desired to slowly bring a fresh surface of the strip to position to operate on the hat. Ordinarily however, the operation of the slide, and the feed, is automatic. To effect this, I secure a collar 267 on the slide 264 to contact with a stop 268 on every movement of the pad to the right, thus limiting the movement of the slide and producing the same result as though the slide were pushed to the left. To vary the amount of this automatic feed the stop is pivoted at 269 to a pin 269ª swiveled to an arm 270 fixed adjustably to the relatively stationary rod 172 and this stop is yieldingly forced toward said arm by a spring 271 secured to said pin. A screw 272 mounted in said arm acts as an abutment for the stop 268, and by adjusting said screw, the position of the end of stop arm 268 may be varied to adjust the effective length of the movement of slide 264 in its support and consequently cause the pawl 260 to rotate the ratchet and the shaft 258 more or less as desired.

The object of pivoting this stop 268 to a rotary element and securing the spring 271 to same element, is to cause the spring to properly bear against the stop at all times, and when said stop has a lateral oscillatory movement it will not scrape across the spring since the latter will always oscillate in harmony with the stop.

I do not limit myself to the particular strip feeding mechanism illustrated and described, but may substitute therefor any mechanical equivalent that is similar in principle. The advantages of the automatic feed are several, and are of especial consequence in a machine the object of which is, as stated hereinbefore, uniformity in the work. It keeps the effective surface of the pad in uniform condition for all parts of a hat and for any number of hats. It saves time to the operator because he does not have to stop to effect changes; and it saves paper because all portions of a long strip, except the extreme attaching ends, are made of equal use. This last fact enables a strip to be used a second time, with the same results as to uniformity, when the work to be done is such as not to require so much cutting effect as is obtained from a new strip. For instance, when hats are to be pounced a second time, after "luring", such a once-used strip may be used a second or a third time.

To enable such second pouncing to be done without removing or shifting the long strip 247, whether that strip is a fresh one or not, I provide an attachment for covering the long strip and at the same time rendering the automatic feed inoperative, such attachment presenting a surface to act on the hat differently from the long strip. Such attachment is shown in Fig. 29, and comprises a strip 273 preferably of a finer grade of paper than the strip 247. To the ends of the strip 273 are connected, by any easily manipulated buckle or clasp arrangement, cross bars 274, 275, the latter having a hand loop 276. To the bar 274 is connected, by springs 277, a cross strip 278 having an arm 279 terminating in a hook 280. Adjacent the swivels 180 are hooks 281 to engage recesses 282 in the cross bar 275 and cross strip 278. When the attachment is positioned, in engagement with said hooks 281, the hook 280 is passed over the collar 267 on slide 264, the length of the arm 279 being such that, to do this, necessitates drawing the slide in so far that said collar cannot contact with the stop 268 as the pad reciprocates, thereby rendering the automatic feed inoperative. The strip 273, when so positioned, protects the strip 247 from such veluring grease as may have been applied to the hat after the first pouncing, and therefore the said strip is ready to go on, from where it stopped, for first pouncing, after the attachment has been unhooked. The strip 273 may, of course, be a section of a long strip which has been used for first pouncing.

Owing to the fact that the pad is swiveled, it may be double-faced, and the long strip fed from one side over and back across the opposite side, so that the same strip can be first used for the first or "rough" pouncing, and the pad turned over to use the already worn paper for second pouncing after "veluring". Such a structure is shown in Fig. 30, in which the strip 247 is led from a supply roll 283, under an idler 284, over an adjacent idler 285, over one face of the pad, about an end idler 286, under the other face of the pad, and around idlers 287, 288, and 289, to winding mechanisms similar to that in Fig. 27. With this arrangement also, the feed may be manual or automatic.

It will be understood, of course, that some suitable brake device will be applied to the supply drum, in all cases, to prevent the strip from being drawn off by the rubbing action on the work.

As indicated in Figs. 25 and 28, a spring 290 may be connected to hold the pad properly on the swivels. Said swivels however, are not so free from friction as to permit the pad to swing out of position. It will thus be seen that the pad is resiliently held against turning with respect to its carrier and when forced out of its normal relation to the carrier as when the pad is close to the brim of the hat this spring accomplishes a tilting effect tending to restore it to normal position and the latter effect results in an additional pressure being exerted on the portion of the hat closest to the brim.

As indicated in Figs. 31 and 32, the backing for the strip 247, instead of being supported by a bottom of metal springs, may be supported on an inflatable air cushion 291. The backing for this cushion comprises a metal shell or trough 292 having a movable slide door with knob 293 covering an opening for the introduction of the air bag. The inflating nipple is indicated at 294, and a flexible but inelastic sheath to inclose the air bag is shown at 295. Said sheath is of a depth to project well above the sides of the shell 292, as best shown in Fig. 32. From this it will be seen that the portion or face over which the strip is drawn may yield in any direction with more or less freedom according to the degree of pressure imparted to the air in the bag 291. Although either form of pad illustrated may be used for brim pouncing, I consider the last described one as the best since it will more readily conform at its sides to the shape of the brim. This pneumatic pad also possesses the advantage of making the structure lighter than those in Figs. 27 and 30. Such a pneumatic backing as shown in Fig. 31 may be substituted for the springs and fabric or felt layers indicated in Fig. 30, thus making a double faced, reversible, pneumatic pad.

Another arrangement of pad may have a roller for the sandpaper, similar to the well known spring roller of a window shade, and therefore will not need illustration. In such structure, the paper would simply be pulled off from the roller and across the face of the pad and attached to the other end of the pad in any suitable manner, by the operator, as occasion might require. And such a device would well be employed for a superimposed strip for second pouncing. In other words, the end of the strip 273, shown at the right in Fig. 29, might be attached to a spring roller, and when the hook 280 is then detached from position, the whole would be wound up by the spring roller and be ready for re-application for second pouncing.

In Figs. 33 and 34, I show a different form of automatic feed for the strip of pouncing material wherein the power for effecting the feed is obtained from the inertia of a weight, and wherein the amount of feed will be automatically governed by the rapidity of the reciprocations of the pad. In said figures, the shafts 251 and 258 and ratchet 259 are the same as those parts in Fig. 27. On the shaft 258 is hung a weight 296 having a pawl 297 engaging the ratchet. A detent pawl is shown at 298. Attached to the weight is a spring 299 in position to be swung against the roll of paper that is being wound on shaft 251. Adjustably connected to the frame is a spring stop 300 having an adjusting screw 301. The amount of swing permitted for the weight is determined by said screw 301. As the pad reciprocates the weight oscillates, due to its inertia, and so causes the pawl 297 to actuate the shaft 258, and, through bevel and worm gearing similar to that in Fig. 27, cause the strip to be wound on shaft 251. As the diameter of the roll on shaft 251 increases, its peripheral speed would, of course, increase for any given arc of swing of the weight; but this is counteracted by the spring 299 which, as the roll increases in size, reduces the arc of swing by contact with the periphery of the roll.

Automatic feeding of the strip by some mechanism, especially coöperates with other parts of the machine which control the rotation of the hat, its changing plane, and the speed of reciprocation of the pad, because all combine to produce uniform work.

Some hats need to be pounced with a lighter touch than others. To provide for this, I employ the following construction: An arm 302 (Figs. 1 and 2) is adjustably clamped on the bearing for rod 172 that is carried by lever 169. In either one of a series of holes in said arm 302 is secured one end of a cord or chain 303 which leads over an idler 304 supported by a bracket 305 which extends from the upright rod 152, the other end of the chain having a series of removable weights 306 known as "step weights." The amount of pressure of the pad against the top and "square" of the hat is varied by removing or adding step weights, or by attaching the chain at a different point along arm 302. The pressure exerted on the side of the crown may be varied by changing the angle at which arm 302 is clamped. As will now be understood, the hat, as it revolves, is so shifted vertically that the action is the same as though it were circular instead of oval; that is, supposing that the work begins at what will be the front of the hat, the axis of the block will rise as the work proceeds along the "front right quarter" (supposing, for purposes of explanation, that such is the direction of rotation), will descend as the work proceeds along the "rear right quarter," and then again rise and again fall, as the work proceeds along the "rear left quarter" and the "front left quarter." This will continue while the work is being done on the sides of the hat.

The cam 102 has a low portion of any suitable length that is concentric with the shaft 48, and the roll 307 is in contact with this low portion when the pad is not operating on the hat but has fallen away from the same in the manner heretofore described. At the ends of this low portion the cam surfaces begin and continue with gradually increasing radii up to a certain point so as to leave a surface of a given length where the cam is concentric with the shaft 48 at its longest throw, and while work is being done on the sides of the hat the roll 307 will be in contact with this concentric surface which I will call the high portion of the cam.

Of course it will be readily understood that when the pad is working on the sides of the hat the maximum of eccentricity will exist between the rotary hat block and the axis of the main shaft, and on this account the concentric high portion of the cam 102 operates to hold the rod 111 at its highest limit so as to maintain this eccentricity uniformly whenever the pad is working against the sides of the hat. As the roll 307 leaves the limits of this concentric high portion the pad will have reached the "square" of the hat, and thereafter the throw of the cam will become less and less as the pad passes over the "square" and approaches the apex of the hat which latter point I term the "zero" point, its location on said cam being at the extremities of the concentric low portion.

As the roll 307 is acted on by the cam 102 at its gradually decreasing radii the rod 111 will be gradually lowered and the eccentricity of the hat block with respect to the main shaft will be gradually decreased ntil said roll is at one of the zero points at which time the axis of the hat block will coincide with the axis of the main shaft.

Owing to the variations of hats, it is often desirable that the rise and fall of rod 111 shall be effected to a greater or lesser degree. To vary this, I mount the roll 307 so that it may be adjusted laterally of the cam, as by a screw 308 (Fig. 1ª) having a yoke 309 engaging an annular groove in the hub of roll 307, said roll being mounted on and shiftable along, a pin 310 carried by the lever 99. The cam itself is laterally tapered somewhat as shown in Fig. 1ª, and therefore will affect the lever 99 differently according to what lateral portions of its periphery the roll 307 is adjusted to bear on.

It will be readily understood that the machine described is capable of use not only for pouncing hats, but for other and analogous purposes, by simply changing the character of the tool. For instance, if the operative face of the tool should present short stiff bristles, or wire, what are known as "scratch-up" hats might be produced, the loosened fibers being then either trimmed, or left rough. Since, for such purpose, it is not necessary to feed the working surface along (as is advantageous when sandpaper is used), the pouncing pad described may be replaced by a brush, or the pad may be covered temporarily by a strip carrying suitable bristles or wire, in the manner above described in connection with the device illustrated in Fig. 29. Therefore, by the word "tool" employed in some of the appended claims, I intend to cover any character of tool capable of either smoothing or roughening the surfaces of hat bodies.

While the machine as illustrated shows the pad or tool mounted in a horizontal plane, I do not limit myself to such structure, as it may be mounted to operate in a different plane with slight alterations in the design of the frame and relative arrangements of the bearings.

I claim:—

1. A machine of the character described, comprising a rotatable hat support, a traversing tool, means for constantly reciprocating said tool to cause the same to operate on the surface of a hat mounted on said support, and automatic means for varying the speed of reciprocation of the tool.

2. A machine of the character described, comprising a rotatable hat support carried by a driving shaft, a tool for operating on the surface of a hat mounted on said support, and means including a treadle for shifting the axis of rotation of the support relatively to the axis of the driving shaft.

3. A machine of the character described, comprising a rotary hat support, a reciprocating tool, a facing strip for said tool, and automatic means for feeding said strip.

4. A machine of the character described, comprising a rotary hat support, a traversing reciprocating tool, facing strip for said tool, and means for feeding said strip during the traversing movements of said tool.

5. A machine of the character described, comprising a rotatable support carrying a hat block, a pouncing pad adapted to operate thereon, means for automatically traversing said pad on the hat from band to tip, rolls for carrying a strip of operating material, and means for automatically feeding the strip from one roll to the other for the purpose of supplying new operating material to the pouncing pad as required.

6. A machine of the character described, comprising a rotatable hat support, a traversing tool having means for actuating it to operate on the surface of a hat mounted on said support, and automatic means for imparting a predetermined irregular varying speed to the operating movements of said tool on different portions of the hat and during the traversing movements of said tool.

7. In a machine of the character described, a rotatable hat support, a traversing tool for operating on the surface of a hat mounted on said support said tool having a facing strip, means for reciprocating said tool, means for varying the reciprocations of said tool as it traverses the hat, and means for automatically feeding said strip during the traversing movements of the tool.

8. In a machine of the character described, a rotatable hat support, a traversing tool for operating on the surface of a hat mounted on said support, said tool having a facing strip, means for reciprocating said tool as it traverses the hat, and means for automatically feeding said strip during its operation on the hat.

9. In a machine of the character described, a rotatable hat support a traversing tool for operating on the surface of a hat mounted on said support, said tool having a facing strip, means for reciprocating said tool as it traverses the hat, means for automatically feeding said strip during its operation on the hat, and means for varying the feeding movements of said strip during the traversing and reciprocating movements of said tool.

10. In a machine of the character described, a rotatable hat support, a traversing tool for operating on the surface of a hat mounted on said support, a facing strip for said tool, means for reciprocating said tool as it traverses the hat, and means for establishing a uniform feed of said strip during the pouncing operation of said tool.

11. In a machine of the character described, a rotatable hat support, a traversing tool for operating on the surface of a hat mounted on said support, means for reciprocating said tool, means for varying the speed of said reciprocations, a facing strip for said tool, means for feeding said strip during its operation on the hat, and means for automatically increasing or decreasing the feeding of said strip in harmony with the increasing or decreasing reciprocatory movements of said tool.

12. In a machine of the character described; means adapted to rotate a hat; a tool adapted to co-act with a hat upon said rotating means; means adapted to cause a relative movement of said hat and said tool in a path extending from the apex to the brim of the hat; automatic means adapted periodically to vary the angular speed of rotation of the hat at different portions of its rotation; and means adapted to change the amount of variation of said speed during the operation of the machine.

13. In a machine of the character described; means adapted to rotate a hat; a tool adapted to co-act with a hat upon said rotating means; means adapted to cause a relative movement of said hat and said tool in a path extending from the apex to the brim of the hat; automatic means adapted periodically to vary the angular speed of rotation of the hat at different portions of its rotation; and automatic means adapted progressively to change the amount of variation of said speed.

14. In a machine of the character described, a rotatable hat support carried by a driving shaft, a reciprocating and traversing tool for operating on the surface of a hat mounted on said support, said tool having a facing strip, means for varying the reciprocations of said tool as it traverses the hat, means for automatically feeding said strip, and means for shifting the position of the axis of the hat support relatively to the axis of the driving shaft.

15. In a machine of the character described, a rotatable hat support, a tool for operating on the surface of a hat mounted on said support, said tool having a facing strip, means for feeding said strip, and a separable facing adapted to overlie said strip.

16. In a machine of the character described, a rotatable hat support, a tool for operating on the surface of a hat mounted on said support, said tool having a facing strip, means for automatically feeding said strip, and a separable facing adapted to overlie said strip, means being provided for checking the feed of said strip when the separable facing is in operative position.

17. In a machine of the character described, the combination with a shaft, of a hat-block chuck connected thereto, said chuck having a plurality of pivoted jaws having springs for moving them in one direction, a ring having cam surfaces, and radial pins in position to be acted upon by said cam surfaces and to actuate said jaws in opposition to their springs.

18. A machine of the character described, comprising a hat support, a carrier having two swinging arms, a tool supported by said arms, means for shifting the carrier and tool relatively to the sides and top of a hat on said support, a rod connected to said tool, and means for actuating said rod, said rod being adjustable in length to vary the degree of lateral movement of the tool as it moves with said swinging arms.

19. A machine of the character described, comprising a hat support, a reciprocatory pad, and means for varying the speed of reciprocations of said pad, said means including a member having adjustable cams thereon.

20. A machine of the character described, comprising a hat support, a reciprocatory pad, and means for varying the speed of reciprocations of said pad, said means including a member having removable cams thereon.

21. A machine for pouncing all portions of the surface of a hat crown, comprising a rotative and laterally movable hat support, a reciprocatory pad having all portions of its operative face substantially equally yieldable, and means for altering the speed of reciprocations of the pad on different portions of the surface of the hat crown.

22. A machine of the character described, comprising a rotary hat support, a pad frame having delivering and winding rolls, an operating strip carried by said rolls, means for automatically operating said rolls to feed the strip, said frame, rolls, and strip, all having an unitary oscillatory movement around a common axis in a direction at an angle to the direction in which the strip is fed.

23. In a machine of the character described, comprising a rotary hat support, a pad frame having at one end a delivering roll and at the other end a winding roll, an operating strip carried by said rolls, said frame, rolls, and strip, having an unitary oscillatory movement about a common axis, and means for manually revolving said rolls to feed and wind said strip.

24. A machine of the character described, comprising a rotary hat suport, a pad frame having at one end a roll for delivering an operating strip and at the other end a roll for winding said strip when used, an operating strip carried by said rolls, said frame and parts carried thereby havig an unitary oscillatory movement about a common longitudinal axis.

25. In a hat crown pouncing machine, a rotatable hat support, a pad frame having rolls, an operating strip carried by said rolls, means for automatically operating said rolls to feed the strip, and means whereby the feeding of the strip may be manually varied during the pouncing operation.

26. In a machine of the character described, a rotatable hat support, a double faced pad adapted to operate on a hat upon said support, and means for feeding an operative strip in operative position over both faces of the pad, whereby a single strip may be caused to produce different effects upon the hat by reversal of the pad.

27. In a machine of the character described, a shaft having a worm and a ratchet, a manually controllable pawl engaging said ratchet, a hat-block chuck operatively connected with said shaft, an operating tool, a worm wheel engaging the worm of the shaft, and means connected with said worm wheel for shifting the operating tool relatively to a hat carried by said chuck.

28. A machine of the character described, comprising a rotary hat support, a differential speed gearing for imparting thereto a change of the speed of rotation, and a foot lever and intermediate connections between said lever and gearing for regulating said change.

29. A machine of the character described, comprising a rotary hat support having an adjustable axis of rotation, means for imparting to said support a change of the speed of rotation, and automatic means for simultaneously shifting said axis and regulating said change of speed.

30. A machine of the character described, comprising a rotary hat support having an adjustable axis of rotation, means for imparting to said support a change of the speed of rotation, and a foot lever and connections intermediate of said lever and said axis and means for simultaneously shifting said axis and regulating said change of speed.

31. A machine of the character described, comprising a hat support, means for imparting thereto an irregular speed of rotation, said means including a shiftable gear, and means for automatically shifting said gear, said means for shifting the gear comprising a laterally movable stud shaft on which said gear is mounted, a cam, and connections between said cam and said shaft for shifting the latter.

32. A machine of the character described, comprising a rotary hat support, adjustable differential gearing for rotating the support, a manually operable lever for adjusting the gearing, and connections including a spring whereby said lever may be shifted without instantly adjusting the gearing, and to permit said spring to complete the adjustment of the gearing.

33. A machine of the character described, comprising a rotatable hat support, a traversing and reciprocating tool, and means for varying the reciprocating operations of the tool against the hat as the location of the operation changes, said means including a rotatively adjustable cam, and a lever actuated by said cam.

34. A machine of the character described, comprising a rotatable hat support, a traversing tool, and means for varying the pouncing operations of the tool against the hat as the location of the operation changes, said means including a laterally tapered cam and a lever actuated by said cam, and means for adjusting the point of contact of the lever and cam.

35. A machine of the character described, comprising an operating shaft, a laterally adjustable slide having a substantially circular groove, a guide plate having ways and connected to said shaft to be rotated thereby, a slide mounted in said ways and having a hat-block chuck and also having a pin engaging the said groove, and a tool for operating on a hat carried by the block.

36. A machine of the character described, comprising an operating shaft, a slide having a groove, a guide plate having ways and connected to said shaft to be rotated thereby, a slide mounted in said ways and having a hat-block chuck and also having means engaging the said groove, counterweights movably connected to said guide plate, connections between said counterweights and the chuck slide to cause the counterweights to move as the chuck slide shifts, and a tool for operating on a hat carried by the block.

37. A machine of the character described, comprising a rotatable hat support, a member having means for swinging it over the body of a hat on said support, a spring plate adjustably connected at one portion to said member, and an operating tool carried by the opposite portion of said spring plate.

38. A machine of the character described having a hat support and a working pad, said pad including a frame, a support for said frame having to and fro movements, pawl and ratchet mechanism for gradually feeding a strip of pouncing material, and means for automatically actuating said pawl and ratchet mechanism.

39. In a machine of the character described, a longitudinally reciprocable pad, a strip of pouncing material over said pad, a supply roll and a winding roll for said strip, said rolls being carried by the said pad, a slide rod, means including pawl and ratchet mechanism for imparting motion from said slide rod to the winding roll, and a stop for varying the amount of reciprocations of said slide rod.

40. In a machine of the character described, a longitudinally reciprocable pad, a strip of pouncing material over said pad, means including a slide rod for feeding said strip over said pad, and a removable strip having means for securing it in position overlying the first mentioned strip and having means for stopping the action of the feed of the first mentioned strip.

41. In a machine of the character described, a longitudinally reciprocable pad base having an inflatable air cushion, and means for feeding a strip of pouncing material across the face of said air cushion.

42. In a machine of the character described, a longitudinally reciprocable pad base having a shell, an inflatable air cushion in said shell, and of a depth greater than that of the shell so as to project above the sides of the latter, and means for feeding a strip of pouncing material across the face of said cushion.

43. In a machine of the character described, a longitudinally reciprocable pad base having yielding bed surfaces on opposite sides thereof, an idler at one end of the base, and means for automatically feeding a strip of pouncing material across one bed surface and over said idler and then over the other bed surface.

44. A machine of the character described, comprising a rotatable support for an oval hat, a traversing tool, means for shifting the axis of the support as different portions of the hat are subjected to the action of the tool, and automatic means for varying said shifting during the traversing movement of the tool.

45. A machine of the character described, comprising a rotatable support for an oval hat, a traversing tool, and automatic means for variably shifting the axis of said support as the tool comes in contact with different portions of the hat.

46. A machine of the character described, comprising a rotatable support for an oval hat, a traversing tool, means for uniformly shifting the axis of the support as the tool traverses the sides of the hat, and means for automatically varying said shifting as the tool traverses the "square" and top of the hat.

47. A machine of the character described, comprising a rotatable support for an oval hat, a traversing tool, means for uniformly shifting the axis of said support to a maximum degree governed in accordance with the difference in length of the major and minor axes of said support while the tool is traversing the sides of the hat, and automatic means for decreasing said shifting as the tool traverses the "square" of the hat and approaches the apex thereof.

48. A machine of the character described, comprising a rotatable support for an oval hat, a traversing tool, automatic means for uniformly shifting the axis of said support while the tool is traversing the sides of the hat, and automatic means for decreasing said shifting at predetermined stages of operation.

49. A machine of the character described, comprising a rotatable support for an oval hat, a traversing tool, means for automatically shifting the axis of said support as the tool traverses the hat, and means for automatically increasing and decreasing said shifting at predetermined stages of operation.

50. A machine of the character described, comprising a rotatable support for an oval hat, a tool, eccentric mechanism for shifting the axis of said support, and automatic means for varying the eccentricity of said mechanism as the tool operates on the hat.

51. A machine of the character described, comprising a rotatable support for an oval hat, a tool, means adapted to cause said tool to traverse the surface of a hat upon said support, mechanism for shifting the axis of said support during its revolution, and automatic means for varying said shifting in accordance with the position of the tool on the hat.

52. A machine of the character described, comprising a rotatable support for an oval hat, a traversing tool, mechanism for shifting the axis of the support as different portions of the hat are subjected to the action of the tool, and instrumentalities for varying said shifting, said instrumentalities comprising a laterally tapered cam, a lever having a laterally adjustable member engaging the same, and means connected with said lever and shifting mechanism.

53. In a machine of the character described, the combination with a shaft, a hat support connected thereto, and a tool for operating on the surface of a hat mounted on said support, of a differential speed gearing for operating said shaft and for automatically imparting thereto predetermined different rates of speed as the tool traverses different circumferential portions of the hat between the band and tip, a lever for varying the connections of members of said gearing, means for holding the lever in adjusted position, and a spring for restoring the parts to normal condition.

54. In a machine of the character described, a rotary hat block, an operating tool, means for reciprocating said tool, a changeable speed mechanism for increasing or decreasing the speed of the block as the major or minor axes of the hat approach the tool, automatic means for effecting variations in said changeable speed, and means for automatically increasing or decreasing the speed of the reciprocations of said tool in harmony with said increased or decreased speed of the block.

55. A machine of the character described, comprising a rotatable support carrying a hat block, a pouncing pad adapted to operate thereon, means for automatically traversing said pad on the hat from band to tip and also from tip to band, rolls for carrying a strip of operating material, and means for automatically feeding the strip from one roll to the other for the purpose of supplying new operating material to the pouncing pad as required.

56. In a machine of the character described, a rotary hat block, an operating tool, a changeable speed mechanism for increasing or decreasing the speed of the block as the major or minor axes of the hat approach the tool, and automatic means for effecting variations in said changeable speed.

57. In a machine for the purpose set forth, the combination with a rotatable hat support the axis of which is adapted to be shifted toward and from the plane of operation of the tool, of means for imparting to said support an automatic irregular speed of rotation.

58. In a machine for the purpose set forth, a rotatable hat support, means for revolving the said support at an irregular angular velocity, and means for automatically varying the irregular angular velocity.

59. A machine of the character described, comprising a rotatable hat support, a traversing tool, means for constantly reciprocating said tool to cause the same to operate on the surface of a hat mounted on said support, and automatic means including frictional cones for varying the speed of reciprocation of the tool.

60. In a machine of the character described; means adapted to rotate a hat; a tool; means adapted to cause a relative movement of said hat and tool in a path extending from the apex to the brim of the hat; means adapted to move the axis of rotation of the hat during each rotation; and means adapted to lessen the movement of said axis in accordance with the proximity of the action of the tool to the apex of the hat.

61. In a machine of the character described; means adapted to rotate a hat; means adapted to move the axis of rotation of the hat during each rotation; means adapted automatically to change the length of travel of said axis as different portions of the hat are being acted upon; and automatic means adapted to vary the angular speed of rotation of the hat at different portions of its rotation.

62. In a machine of the character described; means adapted to rotate a hat; a tool; means adapted to cause a relative movement of said hat and tool in a path extending from the apex to the brim of the hat; means adapted to move the axis of rotation of the hat during each rotation; means adapted to lessen the movement of said axis in accordance with the proximity of the action of the tool to the apex of the hat; an automatic means adapted to vary the angular rate of speed of rotation of the hat at different portions of its rotation; and means adapted to change the amount of variation of said speed.

63. In a machine of the character described; means adapted to rotate a hat; a reciprocating tool; means adapted to cause a relative movement of a hat upon said rotating means and said tool in a path extending from the apex to the brim of the hat; and means adapted to render substantially uniform the abrasive effect of said tool upon all portions of said hat.

64. In a machine of the character described; means adapted to rotate a hat; a tool; means adapted to cause a traversing movement of a hat upon said rotating means and said tool in a path extending from the apex to the brim of the hat; means adapted to reciprocate said tool; and means adapted automatically to vary the speed of reciprocation of said tool substantially in inverse proportion to the convexity of said hat in the direction of said path.

65. In a machine of the character described; a reciprocating pouncing pad comprising an abrasive strip; and inertia-actuated means adapted to feed said strip.

66. In a machine of the character described; a reciprocating pouncing pad comprising an abrasive strip; inertia-actuated means upon said pad adapted to feed said strip at a substantially uniform rate; and means adapted to vary said rate.

67. In a machine of the character described; a reciprocating pouncing pad comprising an abrasive strip; and automatically acting means upon said pad adapted to feed said strip during the action of said pad.

68. In a machine of the character described; a reciprocating and oscillating pouncing pad having rolls mounted thereon to reciprocate and oscillate therewith; an abrasive strip upon said rolls; and means adapted to feed said strip.

69. In a machine of the character described; a reciprocating pouncing pad; a pair of rolls; an abrasive strip mounted upon said rolls; and means mounting said pad with said rolls to permit it to turn as a unit about an axis extending substantially parallel to the effective surface of said strip.

70. In a machine of the character described; a pouncing pad; a pair of rolls; an abrasive strip mounted upon said rolls; means mounting said pad with said rolls to permit it to turn as a unit about an axis extending substantially parallel to the effective surface of said strip; and means adapted to reciprocate said pad with said rolls.

71. In a machine of the character described; means adapted to rotate a hat; a relatively rotatable chucking member; means adapted to prevent rotation of said first means in one direction during chucking; and means adapted to prevent rotation thereof in the other direction during unchucking.

72. In a machine of the character described; means adapted to support and rotate a hat; means adapted to move the axis of rotation of said support synchronously with the rotation thereof; automatic means for changing the amount of said movement; and means adapted automatically to counter-balance the effect of said movement.

73. In a machine of the character described; means adapted to support and rotate a hat comprising a driving member and relatively rotatable chuck controlling member; means adapted to pounce a hat upon said first means; and means adapted to lock said driving member against movement in either direction during the manipulation of said relatively rotatable member.

74. In a machine of the character described; means adapted to support and rotate a hat; means adapted to vary the angular velocity of said rotating means synchronously with its rotation; a pouncing tool; means adapted to cause said tool to traverse the surface of a hat on said supporting means; means adapted to reciprocate said tool; means adapted progressively to change the variation in said angular velocity; and means adapted simultaneously therewith to change the rate of reciprocation of said tool.

75. In a machine of the character described; means adapted to support a hat; a tool adapted to act upon a hat upon said support; an abrasive strip upon said tool; and means adapted automatically to feed said strip at a rate varying automatically with the rate of action of said tool.

76. In a machine of the character described; means adapted to support a hat; a tool adapted to co-act with a hat upon said supporting means; means adapted to reciprocate said tool along a curvilinear path; and means adapted to vary the lateral component of movement of said tool.

77. In a machine of the character described; a rotatable hat support; a double faced pad; and means adapted automatically to feed an abrasive strip into operative position over both faces of the pad whereby a single strip may be caused to produce different effects upon the hat.

78. In a machine of the character described; means adapted to support and rotate a hat; a tool provided with an abrasive surface adapted to co-act with a hat upon said support; means adapted to cause said tool to traverse the surface of said hat; means adapted to reciprocate said tool in a curvilinear path and means adapted automatically to shift the axis of rotation of the hat during each rotation.

79. In a machine of the character described; a hat support; a reciprocating tool adapted to co-act with a hat upon said support; an abrasive strip upon said tool; means adapted to place a portion of said strip under tension; and means mounting said tool and tensioning means to swing as a unit whereby the entire portion of the strip under tension lies substantially in a plane substantially tangent to the portion of the hat which it contacts.

80. In a machine of the character described; means adapted to rotate a hat; a relatively rotatable chucking member; manually controlled means adapted to prevent rotation of said first means in one direction during the operation of said chucking member; and automatic means adapted to prevent rotation of said first means in the other direction during the operation of said chucking member.

81. In a machine of the character described; a hat support; a tool adapted to co-act with a hat upon said support; a carrier upon which said tool is mounted; means adapted to cause said tool to traverse the surface of a hat upon said support, said tool being mounted to swing as it traverses the hat; and a spring mounted between said carrier and tool tending to tilt said tool toward the hat surface in the direction of the brim as the tool occupies a position adjacent the brim.

82. In a machine of the character described; means adapted to support and rotate a hat; means adapted automatically to move the axis of rotation of said support during each rotation; a tool adapted to co-act with a hat upon said support; an abrasive strip upon said tool; and means adapted automatically to feed said strip over said tool.

83. In a machine of the character described; means adapted to support and continuously rotate a hat; a tool adapted to co-act with a hat upon said support; means adapted to cause said tool to traverse the hat; means adapted to actuate said tool; and means adapted automatically to render operative said actuating means as the tool is placed in operative relation to the rotating hat.

84. In a machine of the character described; a hat block supporting member; means adapted to rotate said member with an angular speed which varies during each rotation; automatic means adapted to move the axis of rotation of said member during rotation; a hat block; means adapted to mount said block upon said supporting member; and means adapted to predetermine the angular relation of said supporting member to a block mounted thereon.

85. In a machine of the character described; means adapted to support and continuously rotate a hat; a tool adapted to co-act with a hat upon said support; means adapted to cause said tool to traverse the hat; means adapted to actuate said tool; means adapted automatically to render operative said actuating means as a tool is placed in operative relation to the rotating hat; and means adapted automatically to render inoperative said actuating means as the tool completes its operation upon a hat.

86. In a machine of the character described; means adapted to support and rotate a hat; a tool adapted to co-act with a hat thereon; means adapted to cause said tool to traverse the hat; means adapted to reciprocate said tool; means adapted to stop said reciprocation during said traversing action whereby the fibers of the hat surface are laid in one direction and automatic means adapted to shift the axis of rotation of the hat during each rotation.

87. In a machine of the character described; a hat block supporting member; means adapted to rotate said member; automatic means adapted to move the axis of rotation of said member during rotation; a hat block; means adapted to mount said block upon said supporting member; and means adapted to predetermine the angular relation of said supporting member to a block mounted thereon.

88. In a machine of the character described; means adapted to support and rotate a hat about a periodically shifting axis; a movable member; means adapted as said member is moved in one direction from a predetermined position to rotate said supporting means at an angular rate which varies during each rotation; and means adapted upon said member being moved in another direction to rotate said supporting member at a higher speed.

89. In a machine of the character described; a hat support; a tool adapted to coact with a hat upon said support; means adapted to cause said tool to traverse the surface of the hat; means adapted to reciprocate said tool at a predetermined speed on the sides of the hat; and means adapted automatically to decrease said speed as the tool moves from the side toward the apex of the hat.

90. In a machine of the character described; a reciprocating pouncing pad comprising an abrasive strip; and inertia-actuated means upon said pad adapted to feed said strip at a substantially uniform rate.

In testimony whereof I affix my signature in presence of two witnesses.

JAMES F. DORAN.

Witnesses:
F. W. SMITH, Jr.,
M. T. LONGDEN.